June 2, 1953  F. GEORGE  2,640,779
TURKEY PRODUCT AND METHOD OF PREPARING SAME
Filed Jan. 3, 1950  2 Sheets-Sheet 2
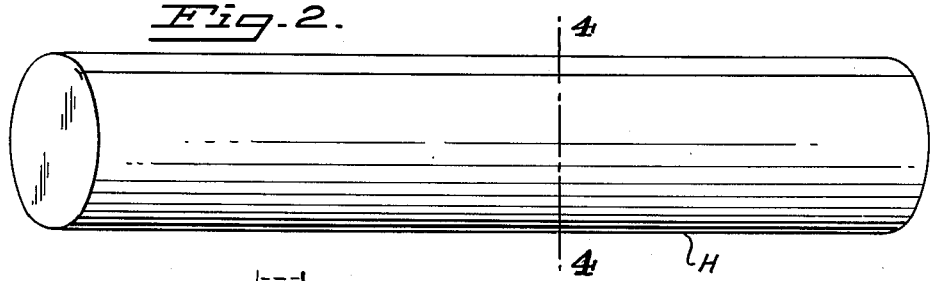
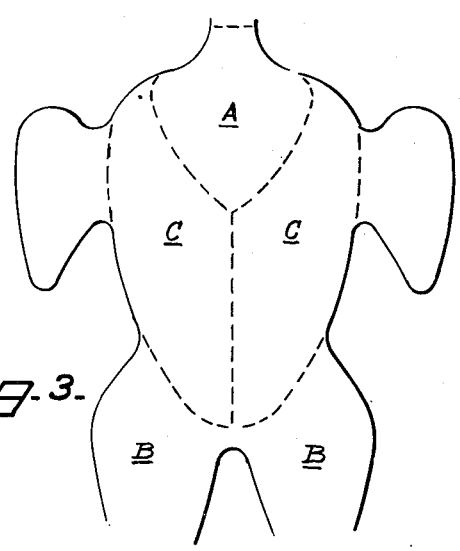
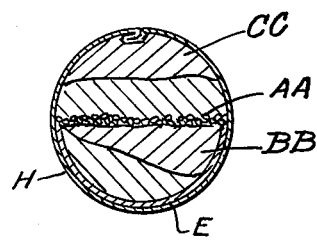
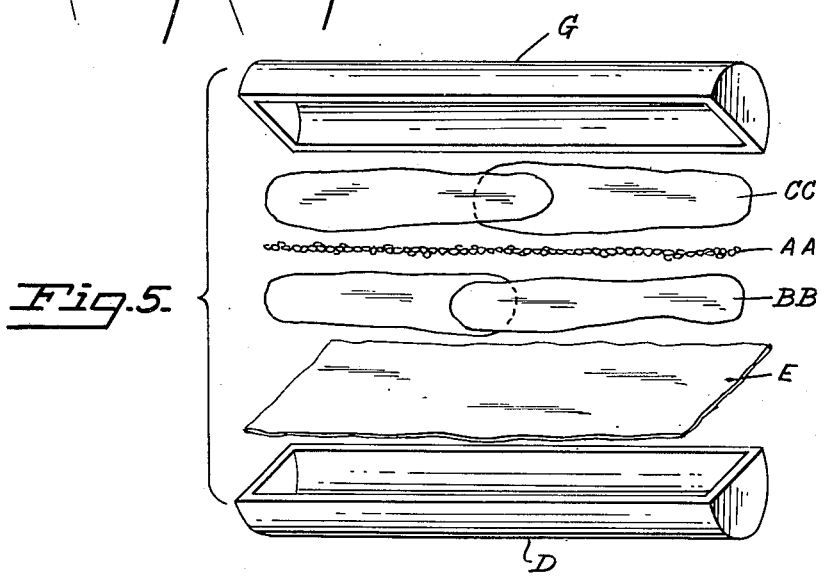
INVENTOR.
FRED GEORGE
BY
Townsend and Townsend
ATTORNEYS

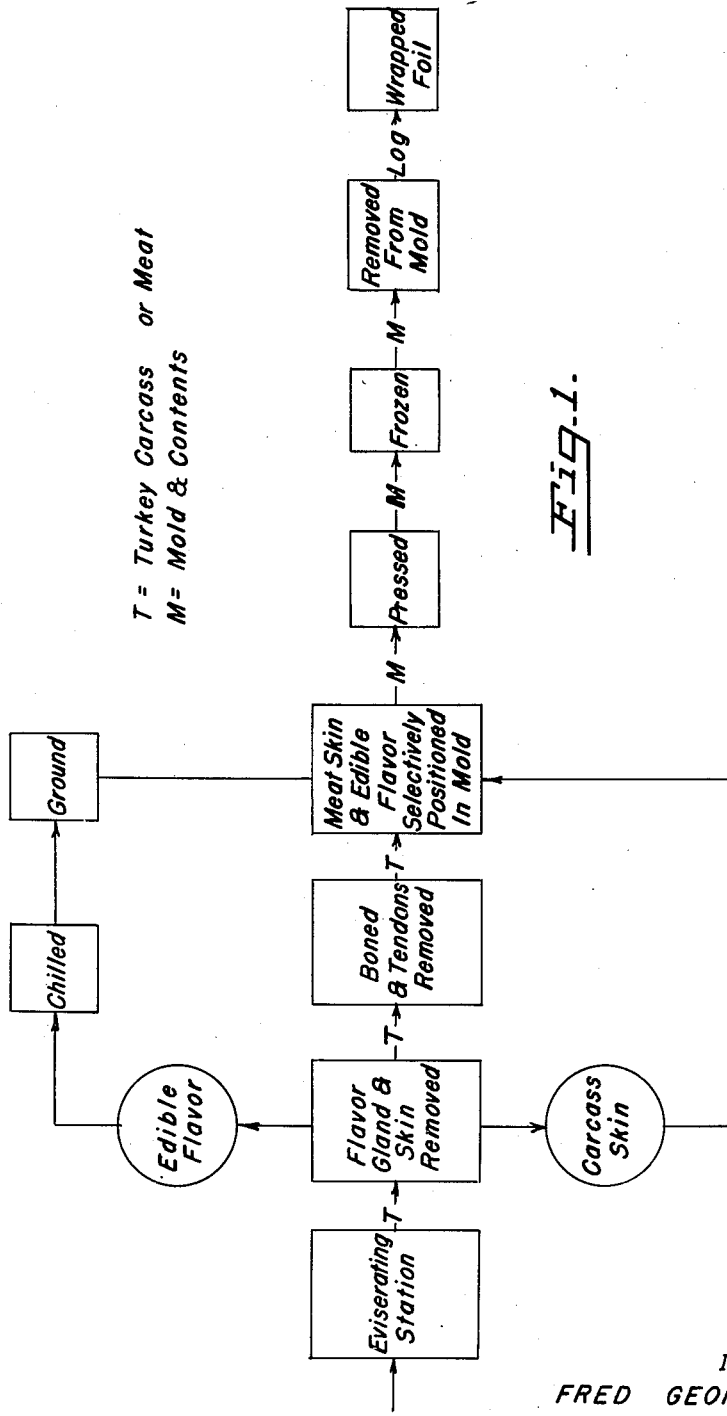

Patented June 2, 1953

2,640,779

UNITED STATES PATENT OFFICE 2,640,779

TURKEY PRODUCT AND METHOD OF PREPARING SAME

Fred George, Berkeley, Calif., assignor of one-half to Norbest Turkey Growers Association, Salt Lake City, Utah Application January 3, 1950, Serial No. 136,544

10 Claims. (Cl. 99—107)

This invention relates to a food product and method of preparing the same. Specifically, the invention relates to a loaf or log of turkey meat and a method of preparing the same, both for commercial marketing and ultimate consumption.

The need has existed for many years in the turkey industry for a means of marketing turkeys in a package which voids the usual difficulties attendant to the sale of not only whole turkeys but also other forms of processed turkey meat as the market heretofore has known such products.

Among the several factors tending toward curtailment of the turkey industry has been: (a) that a whole turkey is too large and cumbersome for the average housewife to handle conveniently; (b) the heretofore commercially available forms of processed turkey do not possess the desirable flavor of fresh whole turkey; and (c) the distribution, packaging, cooking and serving of whole turkeys are difficult, costly and inefficient both as to portion and taste control and shipment and storage.

The present invention contemplates and has for its principal object the manufacture and distribution of boned turkey meat in a convenient log or loaf form, and wherein the flavor of home-cooked whole turkey is preserved.

Another object of the present invention is to provide a turkey loaf or log, wherein the turkey meat is formed into a cohesive mass, enabling convenient packaging, distribution, cooking and serving. Further, the product enables the complete utilization of all the edible parts of the turkey in one, single, cohesive and integrated package, except the neck, extreme wing tips, liver, heart and gizzard.

Further, the new turkey product eliminates the use of the usual kitchen cooking equipment and help require ordinarily for the dressing and carving of whole turkeys.

Other advantages and objects are as follows: There is a complete and absolute portion control of the served meat which is extremely advantageous, particularly in institutional cooking. The product enables reduction of storage and freezer space to approximately one-fourth that required for conventional New York dressed or eviscerated turkeys. There is a reduction of shrinkage in cooking and elimination of the problem of disposal of leftover portions and, again, there is a conservation of food values normally lost in conventional cookery of whole turkeys.

Other advantages and objects will become apparent upon reference to the specification and accompanying drawings in which similar characters of reference represent corresponding parts in each of the several views.

Referring to the drawings:

Fig. 1 represents a flow sheet illustration, showing the various steps in the production of the turkey log or loaf for the commercial market.

Fig. 2 is a perspective view of the commercial log or loaf and illustrating its preferred metallic wrap.

Fig. 3 is a diagrammatic view of a turkey, illustrating the meat parts of the bird which are cut from the carcass to form the log or loaf and indicating the area in which the "edible flavor" of the bird is located.

Fig. 4 is a sectional view of a turkey log.

Fig. 5 is an exploded perspective view of the mold and turkey log components.

The essence of the present invention resides in the preparation of a log or loaf of boned turkey meat in which is contained the essential and characteristic edible flavor of the whole turkey.

The predominant, and until now unsolved, difficulty attendant to the production of a boned turkey product adapted to be frozen and sold in competition with whole turkeys has been in the proper maintenance of the characteristic and desirable turkey flavor.

The subject new product contains a uniform, controlled amount of that portion of the turkey which controls the desirable characteristic turkey flavor. The portion of the bird referred to is described as the triangular area, indicated generally at A, in Fig. 3, and defined by the crop and the anterior medial portion of the pectoral muscles and consists of the skin, fatty tissue and flavor glands contained within this triangular area A. It is difficult to say just how much each of these component portions contributes to the flavor of the product but the flavor glands are essential.

In this specification and claims the subject area and/or components of the area will be referred to as the "edible flavor," "flavor section," and/or "flavor gland" and shall be deemed to include all of the components of the subject area or flavor glands alone or together with one of the other components.

The method of preparing the new turkey product comprises the use of picked eviscerated turkeys which are handled preferably in line production as rapidly as possible to avoid any flavor loss caused by temperature change during the production of the end product. Obviously, the method contemplated and herein described meets with the most rigid of food handling standards, whether Government or self-imposed.

The steps of the method of preparing the food product will now be described: Reference may be had to Fig. 1 which illustrates, by flow sheet representation, the stations or steps included in the preferred method.

The picked and eviscerated birds are preferably suspended from a moving overhead conveyer line. The flavor section is removed from the bird and, preferably, chilled, and thence ground as by a suitable meat grinding machine. The purpose of the chilling of the flavor section is to facilitate the grinding of the said section and is not essential to the practice of the process. The skin is removed from the carcass and is preserved for a purpose as will hereinafter appear. The meat is removed from the carcass in large sections, as indicated diagrammatically in Fig. 3, and preferably the dark meat B is segregated from the white meat C in order that logs (Fig. 2), consisting of all white meat, or all dark meat, or a combination of white and dark meat may be formed at a station hereinafter more fully described.

After the meat has been removed from the carcass, the tendons and other unedible parts of the meat sections are eliminated. The meat is then packed in a cylindrical mold, preferably in the fashion now described with reference to a combination of white meat and dark meat loaf (Figs. 4 and 5).

Over the bottom section of the mold D a piece of carcass skin E is placed, and then a layer of dark meat BB (or white meat) is placed in the mold on top of the skin and fills substantially the bottom section D of the cylindrical mold.

An amount of ground edible flavor AA is then spread uniformly over the meat layer BB from side to side and end to end thereof. The amount of edible flavor included in the log is in an amount equal to or slightly greater than the amount of said material attributable to an equivalent amount, by weight, of meat in a whole turkey. In other words, the ratio of edible flavor to meat in a log is substantially the same as the ratio of edible flavor to meat weight of a whole turkey.

It is noted in this connection that the turkey skin E, used in the log, also contributes substantially to the flavor of the product. The amount of skin utilized is at least as great or greater than one-half the surface area of the meat comprising the log when compressed cylindrically.

The assembly and blending of meat, edible flavor, and skin in the log is extremely important to the success of the end product. The positioning of the ground flavor gland in the approximate middle of the log, between meat layers thereof, is important in that the flavor is preserved within the log during the cooking and serving operations. The flavor is buried in the meat and can not escape therefrom by vapor dissipation except through the meat of the log itself. Again, the edible flavor AA is spread uniformly in the log from end to end and side to side thereof. Further, the skin wrapping contributes to the sealing of flavor within the log and serves to maintain the true turkey taste which is characteristic of the new product.

After the edible flavor AA has been added to the log, as aforesaid, another layer of white meat CC is placed thereupon in an amount substantially equal to the first layer BB. Over the top of layer CC is placed the top section G of the mold and the sections are then compressed together in order to compress the ingredients of the log to form a cohesive mass and eliminate air pockets from the product. Preferably, the mold sections are subjected to between 1000 and 2000 pounds per square inch of pressure and then locked together under pressure.

The mold (preferably formed of a suitable heat conductive metal) containing the turkey log is then placed in a freezer and the product is there hard frozen. Usually the mold is maintained in a freezer for about eight hours at 0° Fahrenheit or lower. After the product has been hard frozen, it is removed from the mold and wrapped, preferably in metal foil H, in order to insure further that the flavor is sealed in the product. Thereafter the log is maintained, preferably in a hard frozen condition, until ready for cooking.

Preferably, the log is cooked in wrapped condition and while hard frozen. The cooking is accomplished in a special roaster described in copending application Serial Number 112,612 for Meat Log Roaster, filed by David B. Cantwell and Fred George, on August 26, 1949, and which said roaster is characterized by a means to exert continuous, uniform, mechanical pressure on the entire wrapped log during cooking in the amount of about ten pounds per square inch.

A preferred cooking and serving procedure involves the placement of the log, in foil wrapped and hard frozen condition, in the roaster, as above mentioned, and then placing the roaster in a suitable oven and cooking the log for about two hours and forty-five minutes at 320° Fahrenheit at sea level. Suitable adjustment for time and temperature are made, depending upon the elevation with respect to sea level. After the log has been thoroughly cooked, the roaster is removed and juice may be drained off from the roast by piercing the wrapper while the log is still within the roaster. Then the log and roaster are chilled, the foil is removed and the log may then be sliced mechanically or manually, as the case may be. Of course, the log may be removed from the roaster and the wrap removed while the log is still warm, if so desired. The exertion of a continuing pressure on the wrapped log, during cooking, helps to maintain the component parts of the log in a cohesive mass.

The further step of chilling the log while still being maintained under pressure results in a permanency of cohesion of the cooked meat. The preferred method of slicing the meat is by means of a mechanical slicer in order to insure portion control which is a great advantage in the present product over heretofore known turkey meat products. It may be further noted that there is considerably greater nutritional value per ounce of food in the present product as distinguished from whole turkey meat cooked in orthodox fashion. For example, 2½ ounces by weight of the present new product is equal in nutritional value to 4 ounces, by weight, of whole turkey cooked in orthodox fashion.

The process hereinabove described may be summarized as resulting in a merchantable turkey meat product having the full characteristic flavor of whole turkey, and wherein the bone, sinew and other unedible parts of the turkey structure are omitted. The process contemplates the steps of first removing the carcass skin from the eviscerated turkey in as near one piece as possible. All of the meat of the turkey is removed from the carcass in large sections (preferably in four sections) e. g. the white meat, which includes the entire breast portion of the turkey plus the shoulder, section of wings, is removed in two pieces right and left; the dark meat, including the middle section of the log (drumstick); upper section of leg (thigh); and the meat found in the rear back structure of the turkey. The dark meat is removed in two sections, right and left. The edible flavor is removed and preferably processed as heretofore set forth.

The components of the log are then assembled in a cylindrical (steel) mold. First, the carcass skin is placed in the bottom section of the mold to form a wrap for the log; then the dark meat is placed on the top of the carcass skin; and then the edible flavor is spread uniformly from end to end and side to side of the first layer of dark meat. The layer of white meat is then placed on top of the edible flavor and, if desired, another layer of carcass skin is placed on top of the white meat although oftentimes it is not desirable to place the skin on top of the white meat for purposes of improved appearance. The top section of the mold is then placed in position and pressure is applied to eliminate all air pockets and to form the meat, edible flavor and skin into a solid cohesive body. The mold is locked under pressure and the contents frozen. Thereafter the hard frozen log is wrapped in suitable pliable metal foil and retained in a hard frozen condition preferably until cooked.

Preferably the log is cooked in a roaster provided with tensioning means to exert continuous surface pressure on the log during cooking and preferably the log is placed in the roaster while hard frozen. After cooking the wrap is removed from the log in readiness for serving, or, alternatively, the log remains in wrapped condition and is chilled prior to serving.

The finished product includes the full bodied flavor of whole turkey meat and is not only juicy but has greater nutritional value than conventional whole turkey meat. Further, the turkey log insures perfect portion control, less shrinkage during cooking, and an elimination of normally wasted parts.

A further addition to the turkey log may be provided by means of an emulsion formed by the heart and gizzard of the turkey formed into a paste and applied uniformly over the dark meat layer. The amount of heart and gizzard emulsion may vary according to taste desires of the consuming public.

The ingredients by weight in a combination log which has been found to be adequate are as follows:

49% white meat
40% dark meat
3% edible flavor
8% skin

The white and dark meat may be more nearly equaled by decreasing the percentage of white meat and proportionately increasing the percentage of dark meat included in the log. Similarly, the amount of carcass skin may be reduced to about 4% to 5% by weight of the log and the weight of meat may then be increased proportionately.

In the specification and claims the product has been referred to as a "log" or "loaf" and is usually referred to as being cylindrical in form. It is understood, however, that the log or loaf may be of any desired shape and not specifically cylindrical.

While the product and the method of preparing and serving the same have been described in rather specific detail by way of illustrative example, it is understood that various changes and modifications may be practiced within the spirit of the invention and scope of the appended claims.

I claim:

1. A food product comprising bone and tendon free turkey meat arranged in layers and containing edible flavor spread uniformly therein, said meat and edible flavor positioned and proportioned to impart a substantial uniformity of taste and texture throughout the product.

2. A food product according to claim 1 and wherein a wrapping of a layer of turkey carcass skin is disposed around at least one half the turkey meat and the product is in a hard frozen condition.

3. A food product comprising bone and tendon free turkey meat arranged in layers and having edible flavor buried uniformly therein, and a wrapping of turkey carcass skin around at least one half the turkey meat, said turkey meat, edible flavor and skin formed into a cohesive mass in the shape of a cylindrical log, and positioned and proportioned to impart a substantial uniformity of taste and texture throughout the log, said product wrapped in pliable metal foil and in a hard frozen condition.

4. A food product comprising bone and tendon free turkey meat, arranged in layers, edible flavor spread uniformly over said turkey meat and a layer of turkey carcass skin enclosing approximately at least one half the surface area of said turkey meat, said turkey meat, edible flavor and skin being formed into a cohesive mass in the shape of a cylindrical roll and positioned and proportioned to impart a substantial uniformity of taste, texture and nutritional value longitudinally and transversely throughout the roll.

5. A food product according to claim 4 and wherein the said turkey meat comprises a layer of dark meat and a layer of white meat, said layers being substantially equal by weight.

6. A food product according to claim 4 and wherein the amount of edible flavor is approximately three per cent (3%) by weight of the roll.

7. A food product according to claim 4 and wherein the edible flavor is approximately three per cent (3%) by weight of the roll and the percentage by weight of the turkey carcass skin is not less than about four per cent (4%) by weight of the roll.

8. A method of preparing a food product comprising the steps of removing turkey meat from a carcass, assembling said turkey meat in layers, adding uniformly edible flavor, wrapping the turkey meat and edible flavor in a layer of turkey carcass skin, forming said turkey meat, edible flavor and turkey skin into a desired shape, applying pressure to the assembled and formed turkey meat, edible flavor and turkey skin, and then freezing turkey meat, edible flavor and skin while under pressure.

9. A method of preparing a food product comprising the steps of removing turkey meat and skin from a carcass, separating the skin from the meat, removing bones and tendons from the meat, separating from the carcass the edible flavor components contained in the crop and anterior medial portion of the pectoral muscles of a turkey, reducing the edible flavor components to a consistency to enable uniform dispersal thereof, assembling the turkey meat in layers and in a desired form, adding the edible flavor components to the assembled turkey meat substantially uniformly from end to end and side to side thereof, wrapping the meat and edible flavor components in turkey skin, submitting the wrapped meat and edible flavor to pressure, and then hard freezing the wrapped meat while under pressure.

10. A method, according to claim 9, and wherein the wrapped meat and edible flavor are submitted to pressure of approximately one thousand to two thousand pounds per square inch and after freezing the product is encased in a substantially moisture-tight, air-tight wrapping of pliable metal foil.

FRED GEORGE.

References Cited in the file of this patent

UNITED STATES PATENTS

| Number | Name | Date |
|---|---|---|
| 2,182,891 | Eikel | Dec. 12, 1939 |
| 2,267,442 | Clark | Dec. 23, 1941 |
| 2,364,049 | Bensel | Dec. 5, 1944 |

OTHER REFERENCES

"Good Wrapping Materials Not Expensive When Properly Used," reprinted from Locker Operator Magazine, August 1946, pages 1–4.

"Food Manufacture," March 1948, pages 121–122, article entitled Turkey Steaks.